United States Patent [19]

Martin

[11] Patent Number: 5,066,956
[45] Date of Patent: Nov. 19, 1991

[54] AZIMUTH-STACKED RADAR METHOD AND APPARATUS

[75] Inventor: Raymond G. Martin, Ellicott City, Md.

[73] Assignee: Westinghouse Electric Corp., Pittsburgh, Pa.

[21] Appl. No.: 441,801

[22] Filed: Nov. 27, 1989

[51] Int. Cl.$^5$ .......................... G01S 13/44; H01Q 3/22
[52] U.S. Cl. .................................. 342/154; 342/157; 342/158
[58] Field of Search ................. 342/158, 157, 153, 154

[56] References Cited

U.S. PATENT DOCUMENTS

| | | | |
|---|---|---|---|
| 3,344,426 | 9/1967 | Long | 342/157 |
| 3,512,156 | 5/1970 | Caruday et al. | 342/157 |
| 3,886,547 | 5/1975 | Bottenberg | 342/157 |
| 4,034,374 | 7/1977 | Kruger | 342/158 |
| 4,118,703 | 10/1978 | Williams | 342/158 |
| 4,253,098 | 2/1981 | Blythe | 342/158 X |
| 4,868,574 | 9/1989 | Racb | 342/158 X |

Primary Examiner—Gilberto Barrón, Jr.
Attorney, Agent, or Firm—W. G. Sutcliff

[57] ABSTRACT

An azimuth-stacked radar method and apparatus of the type typically used for surveillance employs a mechanically-rotating antenna comprising horizontal end-fed rows of antenna radiating elements with phase shifter control on each row together with a monopulse elevation manifold to generate an elevation sum and difference beam pair. Additionally, this radar employs a waveform comprising multiple subpulses at different frequencies with sufficient separation between the subpulses at each frequency to spread them in azimuth to form a beam cluster and employs mechanical antenna rotation and phase-responsive elevation scanning. The scanning is accomplished in a way that will permit advantageous avoidance of ground clutter and other uninteresting radar reflectors.

7 Claims, 7 Drawing Sheets

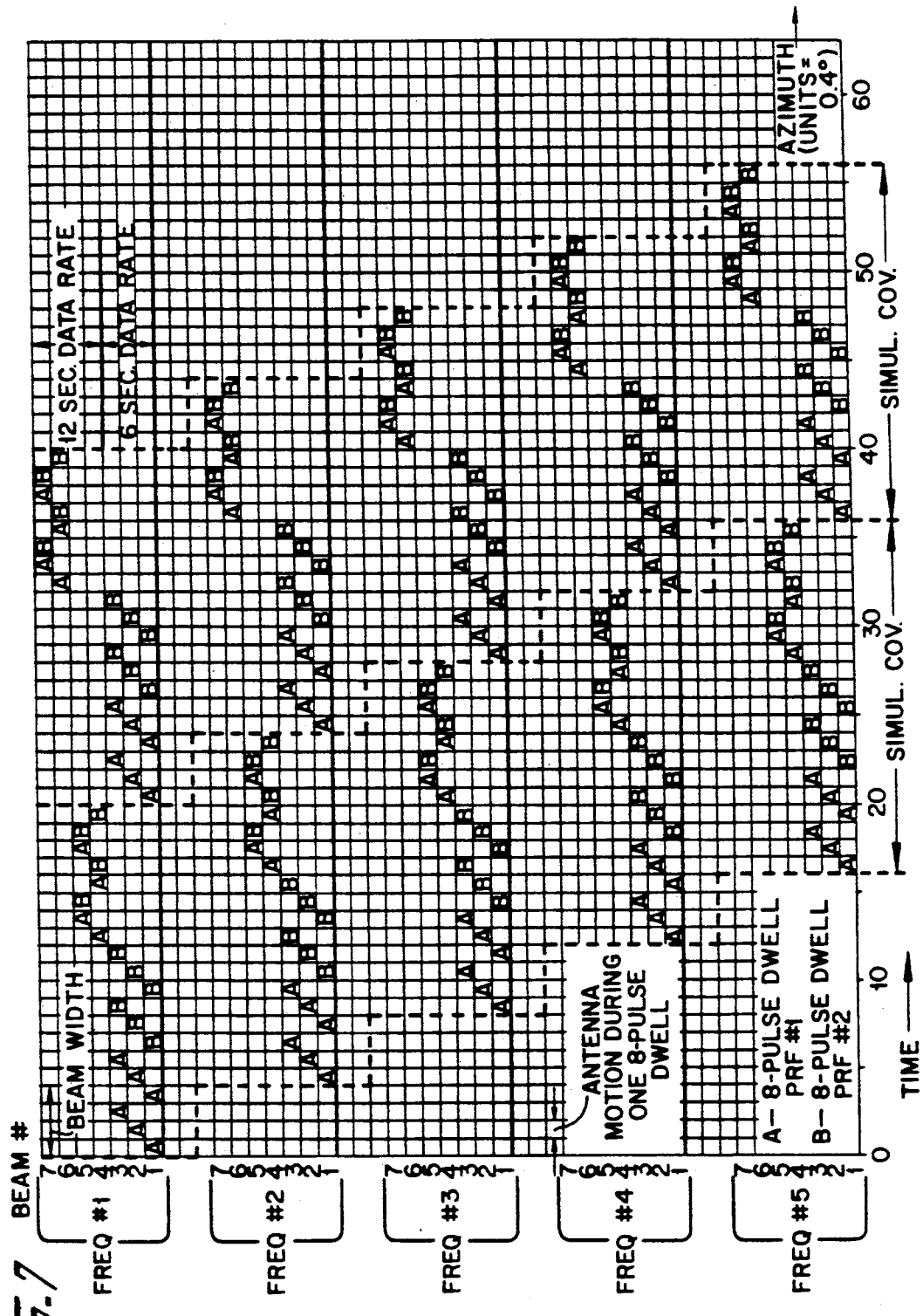
ELEVATION/FREQUENCY PULSE PATTERNS

AZIMUTH-STACKED RADAR METHOD AND APPARATUS

CROSS-REFERENCE TO RELATED APPLICATIONS

This application is related to my copending patent application, Ser. No. 358,294, filed May 26, 1989 and assigned to the United States Air Force.

BACKGROUND OF THE INVENTION

In the field of steerable radars and techniques, many of which are commonly used for surveillance of a given volume, it is frequently advantageous to enhance dwell times in each beam position in the searched volume. Enhanced dwell time should enable more effective discrimination against uninteresting reflectors such as rain, chaff or fixed background.

One of the previous techniques for enhancing dwell time is to employ a receive cluster of beams or beam components arrayed in elevation. The principal reason for the use of this technique as compared with other approaches such as the so-called pencil beam radar is that the use of such multiple beams provide longer dwell times in each beam position than the use of a pencil beam.

A fuller description of a system employing a cluster of beams or beam components arrayed in elevation is found in the article by Thomas E. Keast, "AN/TPS-70 Tactical Radar System" *The Aviation Institute Journal*, Winter 1987, pp. 25-27, and 42. See also Keast's article "Long-Range, Stacked-Beam Surveillance Radar" in *DEFENSE SYSTEMS INTERNATIONAL*, Sterling Publications, London 1988, at pages 222-224.

A variant of such systems is described in Radar Applications, edited by Merrill I. Skolnik, IEEE Press, New York, in the reprint starting at page 144: "Paper 3.2- A High Performance Tactical 3-D Radar for the 1980's" by K. F. Horenkamp et al. This article is also a good source of definitions and explanations of terms and acronyms used in this area of the art.

There are, however, major disadvantages to the employment of a fixed cluster of beams arrayed in elevation. These disadvantages include at least the following four items:

(1) Fixed elevation coverage cannot be altered as a function of elevation angle to accommodate various blocking conditions near the horizon or the need to look below the horizontal level in cases where the radar installation is positioned on a hilltop.

(2) Heavy illumination of so-called ground clutter, which is the type of fixed background that usually occurs at or near the horizon, also is not avoided. This heavy illumination by the transmitted radiation, which must continuously illuminate the full elevation extent of the receive beam cluster, resulting in strong reflected returned radiation, occurs at all times requiring moving target indicator (Doppler) processing and sensitivity time-control processing to compensate to a much greater degree than if the heavy illumination of ground clutter could be reduced or avoided in the upper elevation beams.

(3) All beams or beam components arrayed in elevation must use the same pulse repetition frequency and pulse sequence even though the above-mentioned moving-target indicator processing needs may vary from beam component to beam component.

(4) Each pulse transmission can use only a single narrow-band waveform with a consequently limited set of electronic counter counter-measure capabilities (ECCM).

While a pencil beam radar can avoid the first three disadvantages, it operates at a severe disadvantage in providing the kind of dwell times which are highly desirable in this field of radar techniques.

SUMMARY OF THE INVENTION

My invention is based on the recognition that the major source of the above-described problems is the arraying of the beam cluster in elevation. Accordingly, the invention reverses that preconception by providing a method and apparatus in which the beam cluster is arrayed in azimuth instead, thereby permitting beam dwell schedules of adequate duration in each beam position while enabling greater versatility of the scanning techniques with respect to elevation.

Further, in accordance with my invention, a method of operating a radar system comprises creating a cluster of beams arrayed, or "stacked" in azimuth by control of the relative frequencies of the beams in the cluster, scanning the cluster of beams, including scanning the beams in elevation by varying the relative phases of the antenna elements that are arrayed in the elevation sense, and scanning the cluster of beams in azimuth, primarily by a mechanical rotation.

In the preferred embodiment of my invention, the architecture of the radar system includes horizontal end-fed rows of antenna radiating elements such as, for example, multiple horizontal waveguide antenna elements that transmit and receive through slots in the elements, the plurality of elements being arrayed in elevation and being, respectively responsive to signals differing with respect to phase. The phase shift scheduling by the beam-steering control phase shifters can advantageously employ quadratic or other nonlinear variation of elevation illumination phase functions in order to vary the elevation beam width of the beam cluster as a function of elevation beam-steering angle. Further, the elements are receptive of energy from frequency-and-waveform generators that provide the frequency characteristics for the azimuthal array or cluster of beam components.

While the foregoing features of the preferred embodiment relate to beam formation characteristics for both transmission and reception of the radar waves, a specific feature of my invention further relates to the reception of the radar signal and the provision of a so-called monopulse elevation manifold including a sum and difference beam pair. This sum and difference beam pair, also sometimes called a sigma/delta ($\Sigma/\Delta$) beam pair, enables a more precise location of a reflective target in the elevation sense.

Another significant feature of my invention addresses the problem of the prior art limited electronic counter counter-measure (ECCM) capabilities by providing that the radar uses a waveform that is frequency-rich and therefore enables greater versatility in ECCM techniques. This frequency-richness results basically from the above-described azimuthal array of a cluster of beams differing in frequency and the $\Sigma/\Delta$ elevation manifolding, which provides an additional degree of freedom that can be used in many ways.

BRIEF DESCRIPTION OF THE DRAWINGS

The apparatus and method of the subject invention thus provides a number of important operational advantages, some of which will become further apparent from the following detailed description taken together with the drawings in which:

FIG. 7 shows an alternative beam position schedule for a medium-range radar application.

DETAILED DESCRIPTION

Figure 1:
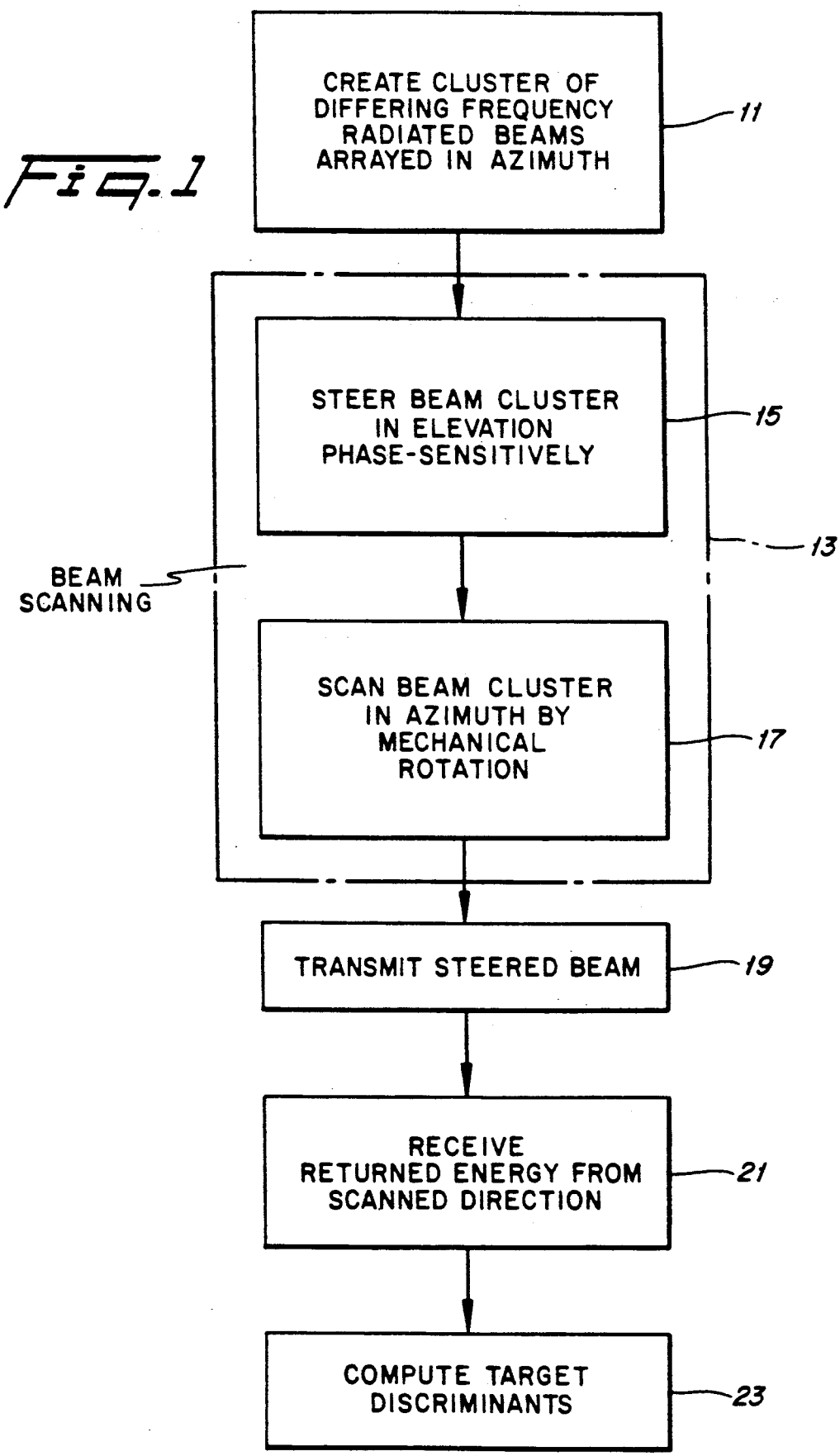
FIG. 1 is a flow diagram of the method of the preferred embodiment of the invention.

FIG. 1 shows a flow diagram of the method of my invention in the typical use context in which the same radar structure both transmits the radar beam energy and receives the reflected returned energy signal.

The method includes step 11 which comprises creating a cluster of differing frequency radiated beams arrayed in azimuth, instead of the prior art single frequency array of beams in elevation. Step 13 broadly encompasses all the beam scanning that is required, that is the typical 360 degree mechanical rotation in azimuth (Step 17) and 20 degree steering in elevation, which are typically the coverage requirements for surveillance. The beam scanning step 13 includes specifically substep 15 of steering or scanning the multiple beam cluster in elevation in response to a pattern of phase variations, as will be described hereinafter. With the beam scanning step 13, the actual transmitting of this scanned beam occurs in step 19. Of course, a few fractions of a second later, the return energy reflected from reflective objects is received from the general direction in which the energy was transmitted. This is the receiving step 21. The final step 23 in this typical use environment comprises computing target discriminants, that is, distinguishing the item under surveillance from those reflective objects of no interest.

Figure 2:
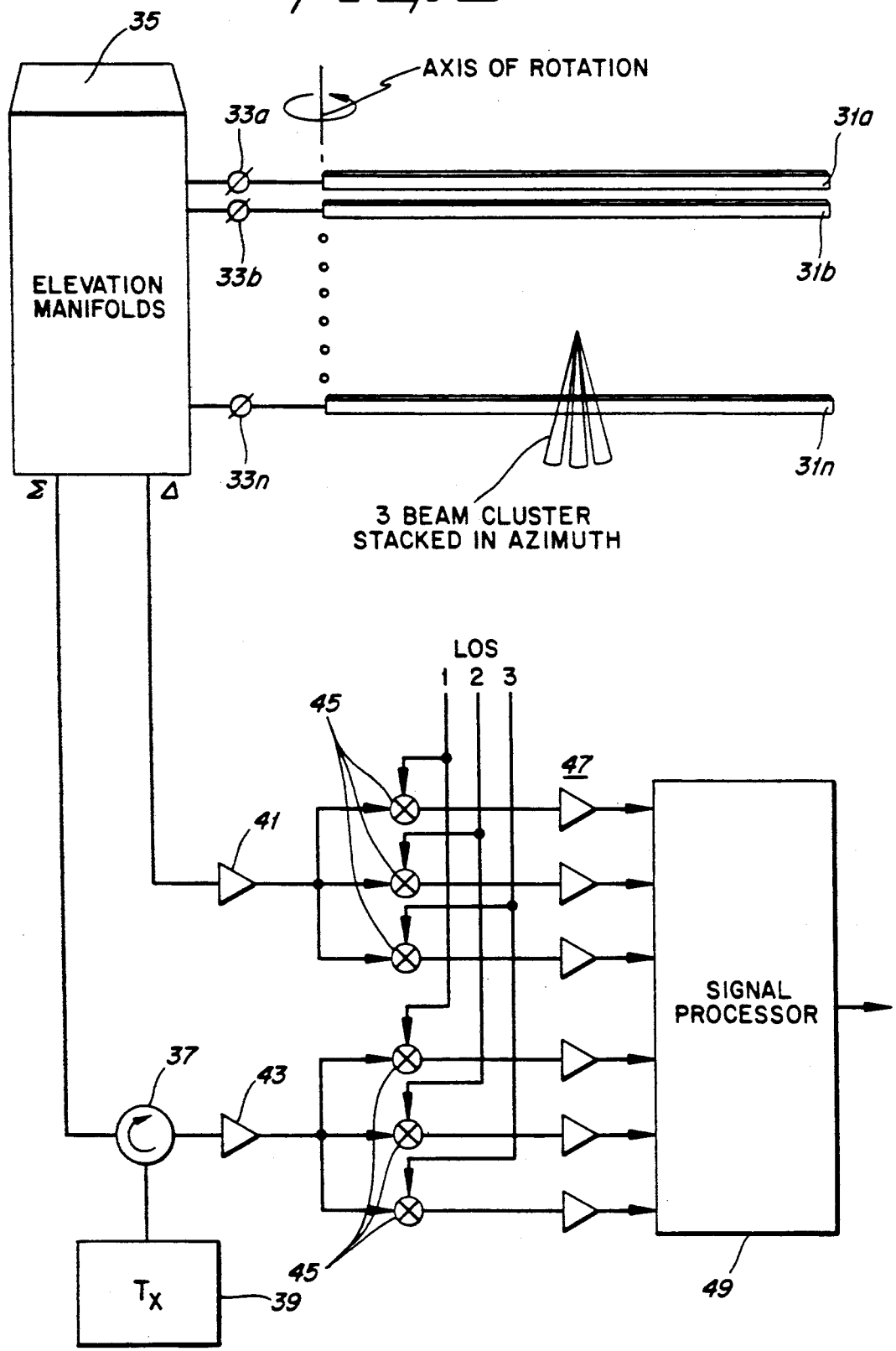
FIG. 2 is a partially pictorial and partially block diagrammatic illustration of the physical architecture of the preferred embodiment of the invention.

In the partially pictorial and partially block diagrammatic showing of FIG. 2, slotted waveguide antenna elements 31a, 31b . . . 31n, through which the radar beams are transmitted and received, are each horizontally oriented. As illustrated, elements 31a, 31b . . . 31n are stacked vertically, in respective horizontal planes, with each element located one above another. While the waveguides are stacked vertically, the beam clusters from these waveguides are stacked horizontally, or stacked in "azimuth". While the waveguide elements 31a through 31n are typically stacked in a vertical orientation with respect to one another as shown, that placement can be modified so long as they are disposed to allow coverage of varying elevation portions of the scanned region in response to the varying phase shift signals from elevation beam scanning phase shifters 33a, 33b . . . 33n. The antenna elements 31a . . . 31n may be considered to be rows of end-fed radiating antenna elements (each slot being an element) and could be replaced by equivalent rows of end-fed radiating antenna elements of other types. The phase shifters are coupled to an elevation manifold 35 which would receive the radiation energy for the transmitted beams from a waveform generator 39 through a circulator 37 and would deliver that energy through a coupling, for example, for just its sum ($\Sigma$) portion, and which would deliver the return reflected energy signals through the coupling for its sum (sigma) portion and a coupling for its difference (delta) portion to an amplifier 43 and amplifier 41, respectively, which are coupled to a set of processing circuits including a set of multipliers 45, a set of amplifiers 47 and the computer signal processor 49. Still, other lines or couplings for inputs (labeled 1, 2 and 3) for the multipliers 45 are derived from three local oscillators (not shown), each of which provides a signal for the channel and for the $\Delta$ channel. The amplifiers 47 are illustratively relatively narrow-band intermediate frequency amplifiers.

Many of the same structural elements shown in FIG. 2 have been used in the prior art three-dimensional radars which have employed the beam components stacked in elevation as mentioned above. To convert the prior art beam components stacked in elevation to the configuration shown in FIG. 2., i.e., with the beam components stacked in azimuth, one must turn the previously-avoided squint properties of waveguide sticks to an advantage by coupling the appropriate frequency variations into them. See the above-cited article by Thomas E. Keast. In any case, such components are used in a significantly different fashion than in the prior art, as will become clear hereinafter.

In particular, the slotted waveguide antenna elements are described therein and attributed to AWACS technology. While such antenna elements are relatively immune to jamming, their so-called "squint" properties, a variation in lobe direction as frequency changes, is there treated as a necessary evil to be overcome. Notice the "Azimuth desquint" function shown in the System Block Diagram on p. 27 of that article. In the embodiment of FIGS. 1 and 2, the "squint" properties are essential to step 11. Generator 39 supplies the requisite frequency variations.

Other basic components and techniques employed in various portions of FIG. 2 may be found in, for example, the Naval Research Laboratory's Radar Handbook, edited by Merrill I. Skolnik, McGraw Hill, N.Y. The phase shifters 33a . . . 33n and manifold 35 provide the functions described in chapter 1 by Theodore Cheston et al. at page 11-6, under the heading "Scanning of Arrays—Phase Scanning". The production of a pattern for transmission characterized as the sum (E) feed is straight-forward as described at p. 11-50 under the heading "Constrained Feeds—Series Feeds". That section goes on to describe sum and difference pattern outputs, which are of the type used in the embodiment of FIG. 2 for implementing reception of the reflected returned signal (pp. 11-50 to 11-52). The purpose of the difference or delta function of the sigma-delta monopulse pair is a subdividing of available combinations of signals resulting from the elevation scanning to enable greater precision of target position determination with respect to elevation. In general, it can be said that each sigma-delta monopulse pair is a different combination of the signals received at a plurality of the antenna waveguide elements.

The physical description and the basic functions of each of the elements of FIG. 2 as found in the prior art references are incorporated by reference herein.

While the method of the invention is useful in antenna systems operating in S band which is centered at 3000 MHz or, equivalently, 3 GHz, it can also be used at L band which is centered at the lower frequency of about 1300 MHz or equivalently 1.3 GHz. The slotted waveguide elements or "sticks" 31a through 31n are well known for use at S band so the preferred embodiment of the invention will be described for use in that frequency range. Nevertheless, similar waveguide antenna elements have been developed for L band and the invention is equally feasible for use in that range as well as other frequency ranges.

The operation of the invention at S band will now be described.

The system at FIGS. 1 and 2 has an operating bandwidth of 200 MHz, from 2.9 to 3.1 GHz. Its antenna slotted waveguide sticks produce a beam of 1.6 degree azimuthal lobe width that squints a total of 6 degrees, or approximately four beamwidths, for frequency variation across this band. Recent tests have shown that the antenna itself functions across a wider bandwidth (at least 300 MHz) with correspondingly greater squint capability. A basic description of the squint characteristics of slotted waveguide antenna elements may be found in chapter 13 by Irving Hammer in the above-cited Radar Handbook, at page Thus, within the existing system bandwidth limitations, operation with transmitted subpulses at five different frequencies spaced approximately 50 MHz apart over the 2.9 to 3.1 GHz band would provide the maximum achievable number, namely five, of simultaneous and distinct contiguous azimuth beams, that would span a total of about 7.5 degrees in azimuth. In this case, five separate receivers would be needed for the elevation sum channels and five more for the elevation difference channels, for a total of ten.

However, very useful operation can be achieved with only three subpulses, again spaced at 50 MHz, hence producing three contiguous azimuth beams spanning approximately 4.8 degrees in azimuth, as illustrated in FIG. 2, and requiring a total of only six receivers, equal in number to those currently used in the system described in the above-cited article by Keast.

A currently preferred way to determine azimuth angle in the method of invention is a sequential beam-splitting series of steps in which each beam position is visited twice in succession with dwells having the same wave form, frequency and pulse repetition frequency (prf), and with a time spacing between the dwells sufficient for the mechanical rotation of the antenna to displace the beams approximately 0.8 beamwidths in azimuth between the two dwells.

Since the above-mentioned required coverage of a typical surveillance radar indicates less need for resolution with an increase of elevation angle due to target upper altitude limitations, and a related performance requirement is generally for a given height accuracy rather than a specific elevation angle accuracy, it is allowable and convenient to vary an elevation beam width as a function of elevation beamangle, using broader beams at relatively higher angles. This is readily accomplished by the configuration shown in FIG. 2 by using quadratic or other nonlinear variations of the elevation illumination phase function by appropriate settings of the beam scanning control phase shifters.

Figure 3:
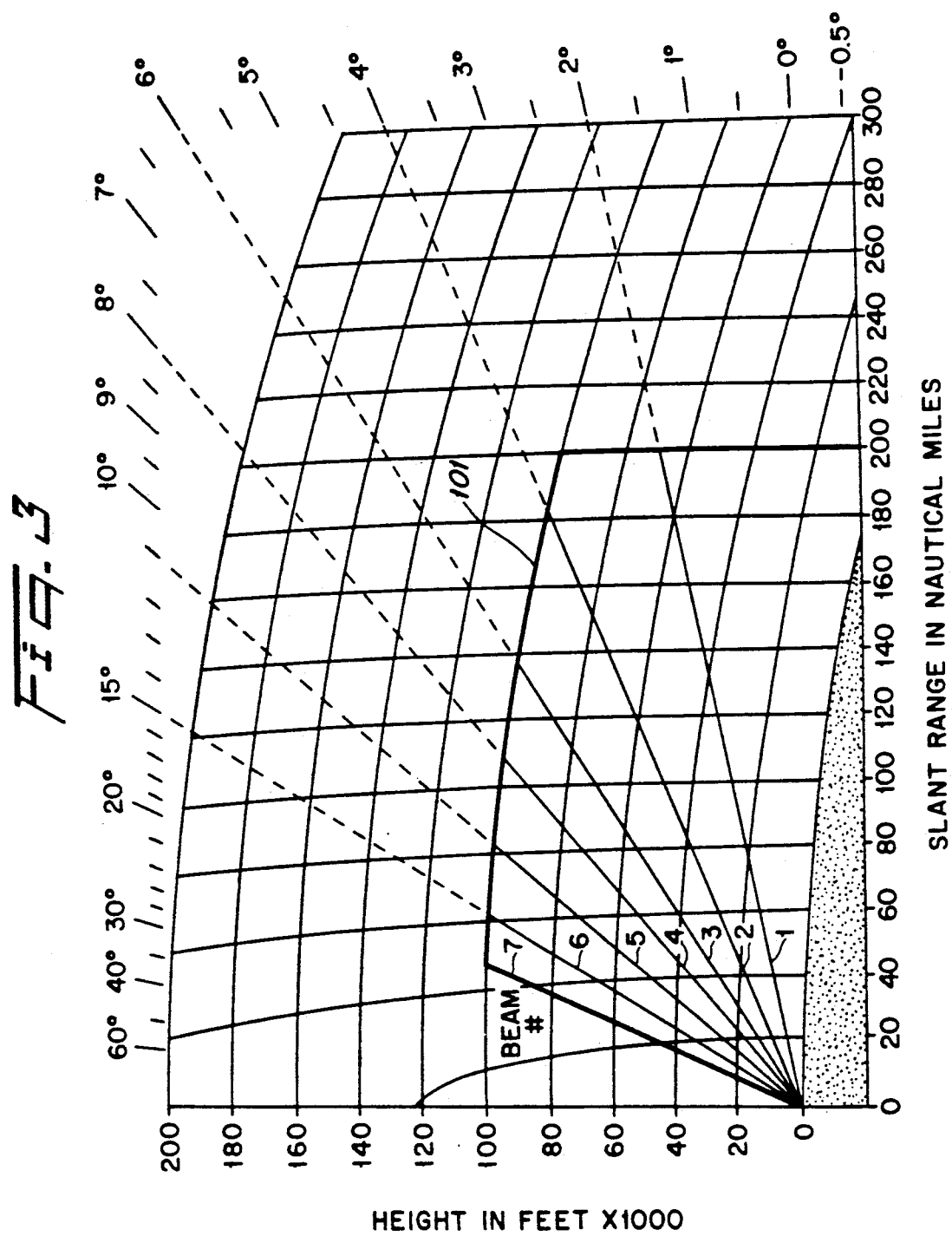
FIG. 3 shows curves useful in explaining the invention.

For a long range radar (200 nautical miles) with 100 kft altitude coverage to 20 degrees in elevation, 7 is a convenient number of antenna elevation lobes or beams, for which beamwidths of 2, 2, 2, 2, 3, 4, and 5 degs. respectively are a reasonable choice as shown in FIG. 3. Illustrative ranges for each of these beams can be found at the intercept of the respective beam elevation with a range curve 101.

Note that the just-described properties of this configuration are expected to permit the achievement of superior elevation sidelobe level control as compared with that obtainable in the existing elevation-stacked beam designs where manifolding errors limit achievable performance. Also note that the reduced cost of this simpler elevation manifolding will, at least partially, offset the cost of the required elevation phase shifters 33a through 33n in FIG. 2.

The new preferred embodiment of FIGS. 1 and 2 offers a great deal of flexibility in the pulse/beam-positions schedules that can be used with it and there is no intention to attempt to define all possible useful schedules in this application. However, some representative samples are given in the following paragraphs.

Figure 4:
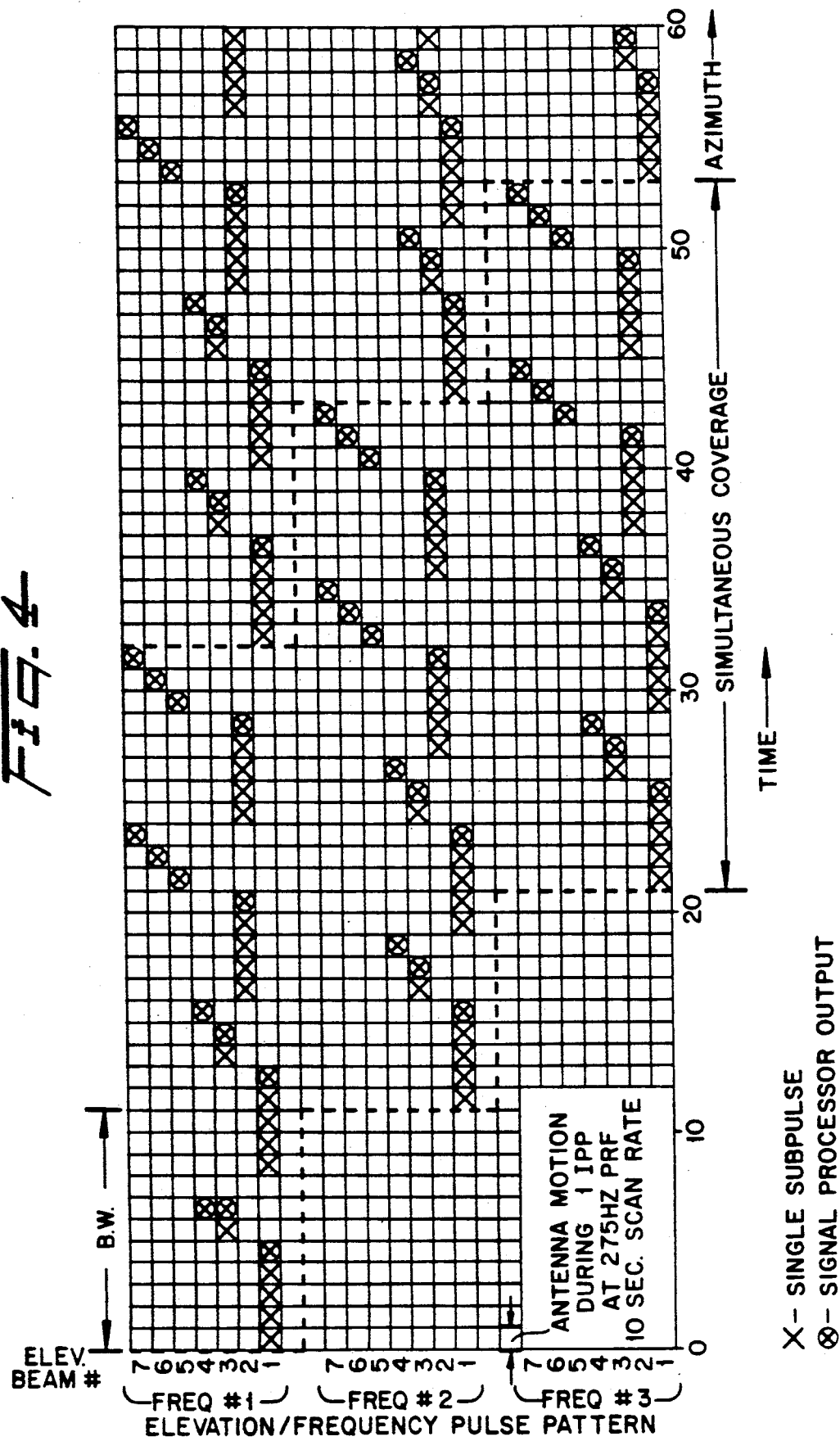
FIG. 4 shows a schedule of pulse beam positions for a long-range radar application.

FIG. 4 provides an example of a pulse/beam position schedule suitable for a three azimuth beam cluster and for a long range coverage mode using the configuration of FIGS. 1 and 2, and employing a 10 sec. scan rate and giving the coverage shown in FIG. 3. A radar operating with this schedule provides moving-target indicator (MTI) capability against ground clutter in the two lower elevation beams, with normal (non-MTI) processing in the upper beams where the moving-target indicator Doppler processing against ground clutter is not needed because sufficient clutter discrimination is obtained by the two-way elevation sidelobe levels.

For simplicity of presentation, each interpulse period (IPP) in FIG. 4 is shown of equal length, whereas in a more refined design advantage can be taken of the reduced instrumented range requirements in the upper beams to reduce the IPPs in those beams. The number of pulses transmitted in these upper beams is also reduced to match the corresponding reductions in required detection range.

The moving-target indicator pattern of dwell times, mentioned above, employs five pulses that would generally be spaced by variable IPPs for blind speed elimination. One alternative for achieving such a result is that the returns from these pulses would be processed through parallel orthogonal moving target indicator filters to reduce the burst processing losses as described in my U.S. Pat. No. 4,618,864 with Mr Mims issued Oct. 21, 1986. Note that each pulse burst dwell, for both moving-target indicators and normal dwells, is repeated at approximately 0.7 beamwidth spacing to accomplish the azimuth angle determination function mentioned above.

The portion of FIG. 4 shown between dotted lines indicates how one sequence through the pattern of beam dwells provides surveillance of a part of the required coverage. Corresponding portions from subsequent sequence repetitions adjoin to provide the entire required coverage. Note that the dotted lines are offset for different frequencies to provide meaningful sequences of pulses.

Figure 5:
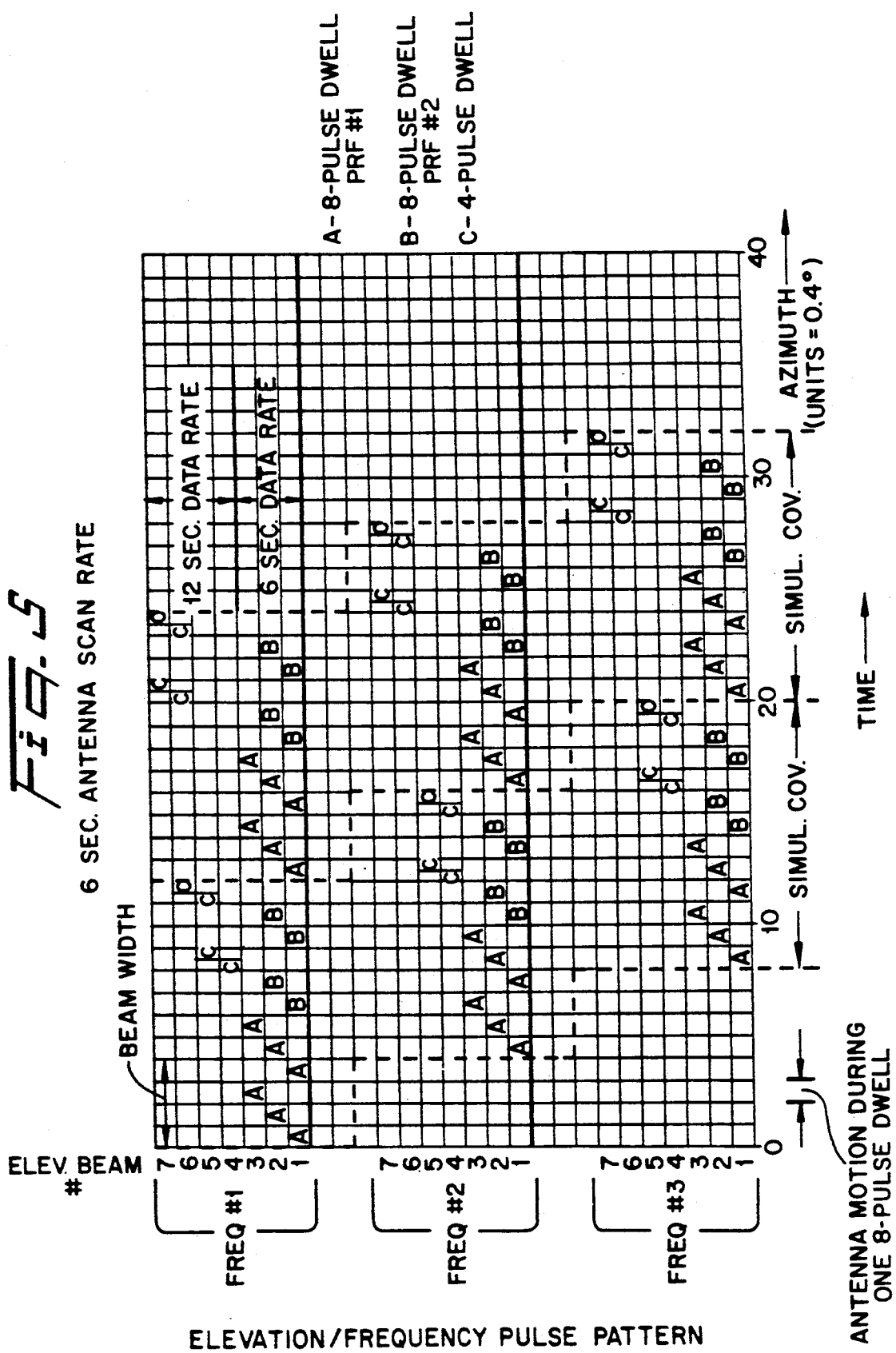
FIG. 5 shows a similar beam position schedule for a medium-range radar application.
Figure 6:
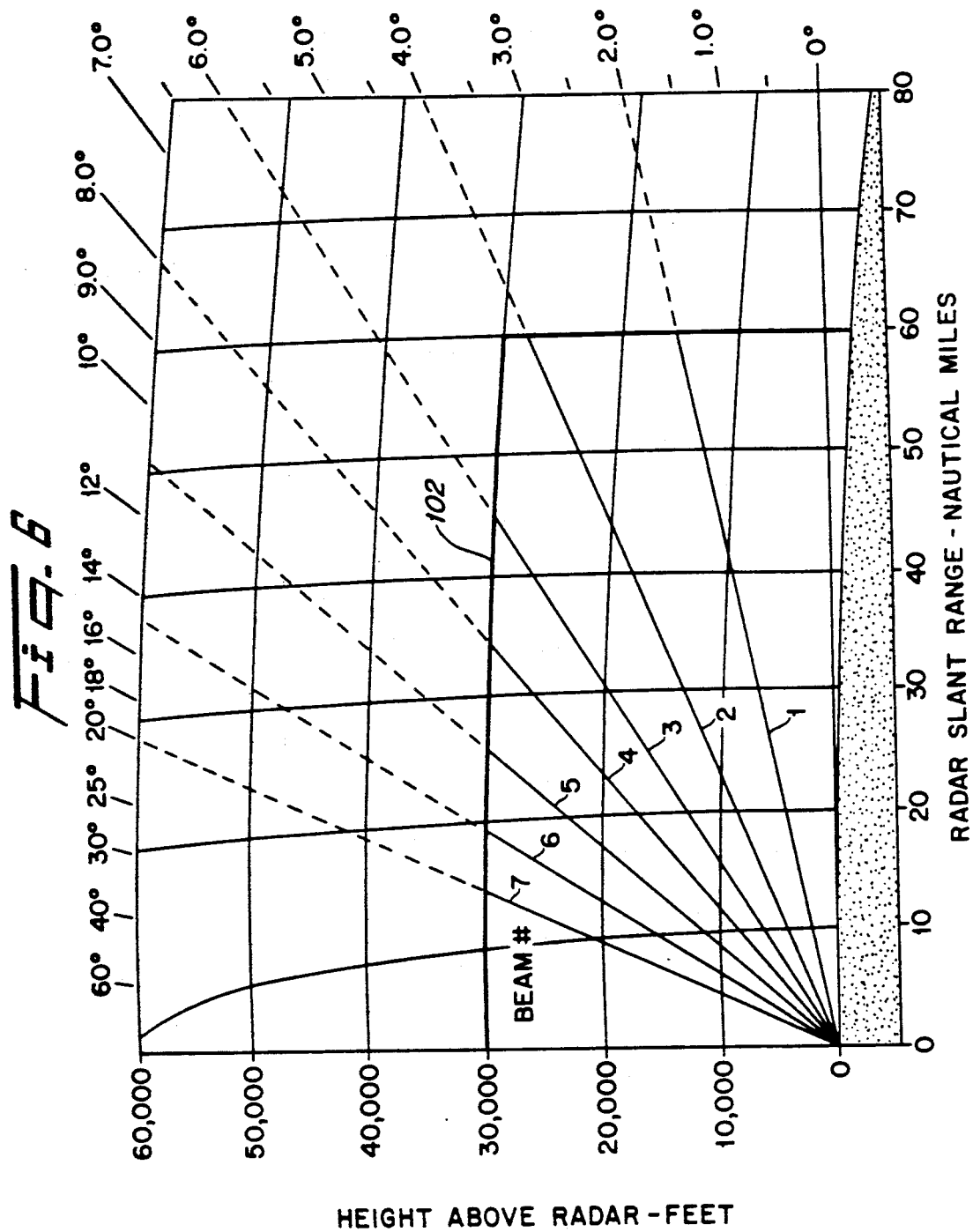
FIG. 6 shows curves useful in explaining the medium-range radar coverage requirements.

FIG. 5 shows another example schedule for a 3-azimuth-beam cluster configuration, in this case for a medium-range (100 Km) mode employing multi-pulse dwells appropriate for moving-target indicator (Doppler filter bank) processing to combat wide spectrum clutter such as rain or chaff, and using a 6 sec. antenna scan rate. FIG. 6 shows a typical beam coverage requirements, via curve 102, for this type of operating mode.

The elevation beam steering schedule is chosen, in this case, to provide a 6 sec. data rate in beams 1-3 and 12 sec. rate in beams 4-7. This is shown in FIG. 5 as being accomplished by visiting beam pairs 4/5 and 6/7 on alternate elevation scans with the assumption that on the next azimuth scan the azimuth locations of these visits are interchanged to complete the entire coverage in two rotations of the antenna. Alternatively, the 4/5 and 6/7 elevation beam coverages could be accomplished on an alternating azimuth scan basis.

The pulse dwells are selected on the assumption that ground clutter rejection is required in the lower two elevation beams but not in the other upper beams. Thus, two sets of dwells at different pulse repetition frequencies are provided in the two lower beams in order to eliminate blind speeds. Full 8-pulse bursts and moving-target indicator (Doppler) processing are provided by the lower three elevation beams, but the total number of pulses transmitted in each elevation beam position reduces with elevation angle to match the reduced range coverage requirements shown in FIG. 5. Thus, four 8-pulse bursts are used in beams 1 and 2, two 8-pulse bursts in beam 3, and two 4-pulse moving-target indicator (Doppler) processing would be provided. Note again how the vertical dotted lines are offset for different frequencies to define meaningful sequences of pulses.

As a final example, FIG. 7 shows an alternative schedule for a medium-range application, using a 5-azimuth beam (5 subpulse frequencies) approach, to provide full moving-target indicator Doppler processing in all elevation beams and illustrates how increasing the number of subpulse frequencies and receivers extends the Doppler processing capabilities of the system. Note again how the vertical dotted lines are offset for different frequencies to define meaningful sequences of pulses.

The data rate in the upper four beams is still one half of that in the lower three beams, but in this example all seven beams employ four 8-pulse dwells using two different pulse repetition frequencies to reduce blind speeds resulting from moving-target indicator Doppler filter desensitization necessary for either ground or chaff/rain clutter rejection.

To take advantage of the full scheduling flexibility of the disclosed architecture, it would probably be most advantageous to use a grid-controlled transmitter power tube rather than the cathode-pulsed twystron currently used in prior art. However, the present twystron approach could certainly be adapted to specific schedules, of which that shown in FIG. 4 is an example in point. A 9.75 μs pulse comprising three 3.25 μs subpulses, each using a 13 element Barker code modulation, would be an appropriate waveform in that case, to be used in the embodiment of FIGS. 1 and 2.

Note also that the disclosed architecture is readily compatible with a possible future change to an all solid state distributed transmitter, in which case individual transmitter modules could be incorporated to feed each stick (waveguide antenna element) of the slotted waveguide array, with low level phase shifters at the transmit module inputs to accomplish the beam steering function.

The following is a list of the operation benefits provided by the new radar architecture:

It permits selection of different Doppler processing at different elevation angles to match differing clutter conditions.

It simplifies antenna manifolding, hence permitting better elevation sidelobes, which benefits the upper beams against stand-off jamming typically at low elevation angle.

It permits contouring of the lower beam(s) coverage to match the terrain, including an adaptive look-down capability.

It allows different (i.e. lower, e.g. 1/2) scan rates in the upper beams than in the lower beams, to help maximize the horizon scan rate.

It allows higher pulse repetition frequencies in the upper beams than in the lower beams, which is possible because their required instrumented ranges are less due to a maximum altitude coverage limit.

Its multiple simultaneous widely spaced transmit frequencies provide good electronic counter counter-measure capabilities especially against sidelobe jammers.

It greatly reduces clutter effects in the upper beams, as compared with an elevation stacked beam approach, reducing the need for heavy sensitivity-time control at the higher elevations and aiding in detecting low reflectivity ("stealth") high elevation targets.

What is claimed is:

1. A surveillance radar system, comprising:
a transmitter for generating at an output thereof radiant energy pulses of a predetermined duration and interpulse period, each of the generated pulses including a plurality of contiguous subpulses, each subpulse having a frequency different and sufficiently separated from the frequency of the other subpulses of the same generated pulse to create a distinct beam in an azimuth direction different and sufficiently separated from the distinct beam of each of the other subpulses of the same pulse when applied to an antenna having azimuth squint characteristics;
a mechanically rotatable antenna having a plurality of horizontal end-fed rows of antenna elements connected to the output of the transmitter, each of said antenna elements having azimuth squint characteristics, said antenna including antenna elevation manifolding means configured to form an elevation beam pair having sum and difference receive elevation patterns; and
a plurality of distinct receiving means, each of said plurality being associated with one of the subpulses of a radiant energy pulse, for receiving return energy of a corresponding frequency, each of the plurality of distinct receiving means includes a first receiver for receiving an elevation sum ($\Sigma$) signal of each beam pair, and a second receiver for receiving an elevation difference ($\Delta$) signal of each beam pair.

2. The system of claim 1 further comprising means for varying the phase of each row of end fed antenna elements for scanning the beams in elevation during rotation of the antenna in azimuth.

3. The surveillance radar of claims 1 or 2, wherein each of the plurality of end-fed rows of antenna elements are substantially parallel to one another and spaced apart in elevation.

4. The surveillance radar of claims 1 wherein the generated spaced pulses include a repetitive first plurality of adjacent pulses for one elevation and repetitive second plurality of adjacent pulses subsequent to each repetitive first plurality for another elevation higher than the one elevation, each said second plurality including either equal or fewer adjacent pulses than each said first plurality.

5. In a surveillance radar system employing an antenna having a plurality of mechanically rotating horizontal end-fed rows of antenna radiating elements having azimuth squint characteristics, a method of operation comprising the steps of:
generating spaced radiant energy pulses of a predetermined duration and interpulse period;
dividing each of the generated pulses into a plurality of contiguous subpulses with each subpulse having a frequency different from the frequency of another subpulse of the same generated pulse, the frequencies being sufficiently separated to create for each subpulse of a respective pulse a distinct beam in an azimuth direction different from the distinct beams of the other subpulses when applied to the antenna;
applying each of the generated pulses to the antenna during rotation thereof to create a cluster of beams of different frequencies squinting in azimuth for scanning the beams in azimuth;
providing a dual output elevation manifold for the antenna for forming a multiplicity of beam pairs, the frequency of each beam pair corresponding to the frequency of the respective subpulses;
receiving echo signals from each beam pair distinct from the echo signals of the other beam pairs corresponding to the sum ($\Sigma$) of each beam pair;
receiving echo signal from each beam pair distinct from the echo signals of the other beam pairs corresponding to the difference between each beam of the beam pair; and
receiving said echo signals of each of the subpulses separately and independently of the echo signals of the other subpulses of each pulse during the interpulse periods.

6. The method of claim 5 further comprising the step of varying the phase of the end fed antenna rows for scanning the beams in elevation.

7. A surveillance radar system, comprising:
a transmitter for generating at an output thereof radiant energy pulses of a predetermined duration and interpulse period, each of the generated pulses including a plurality of contiguous subpulses, each subpulse having a frequency different and sufficiently separated from the frequency of the other subpulses of the same generated pulse to create a distinct beam in an azimuth direction different and sufficiently separated from the distinct beam of each of the other subpulses of the same pulse when applied to an antenna having azimuth squint characteristics;
the generated spaced pulses including a repetitive first plurality of adjacent pulses for one elevation and repetitive second plurality of adjacent pulses subsequent to each repetitive first plurality for another elevation higher than the one elevation, each said second plurality including either equal or fewer adjacent pulses than each said first plurality;
a mechanically rotatable antenna having a plurality of horizontal end-fed rows of antenna elements connected to the output of the transmitter, each of said antenna elements having azimuth squint characteristics;
means for varying the phase of each row of end-fed antenna elements for scanning the beams in elevation during rotation of the antenna in azimuth; and
a plurality of distinct receiving means, each of said plurality being associated with one of the subpulses of a radiant energy pulse, for receiving return energy of a corresponding frequency.

* * * * *